(12) United States Patent
Alarid et al.

(10) Patent No.: US 8,346,874 B2
(45) Date of Patent: Jan. 1, 2013

(54) MAIL OBJECT MIGRATION

(75) Inventors: Jason Daniel Alarid, Bothell, WA (US);
Larry H Draper, Jr., Bothell, WA (US);
Stephen J Wannenmacher, Kirkland, WA (US); Mark W Jones, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 12/018,179

(22) Filed: Jan. 22, 2008

(65) Prior Publication Data

US 2009/0187632 A1 Jul. 23, 2009

(51) Int. Cl.
*G06F 15/16* (2006.01)
(52) U.S. Cl. ...................................... 709/206
(58) Field of Classification Search .................. 709/206, 709/207
See application file for complete search history.

(56) References Cited

U.S. PATENT DOCUMENTS

| | | | |
|---|---|---|---|
| 5,819,272 A * | 10/1998 | Benson ................................ | 1/1 |
| 5,909,483 A | 6/1999 | Weare et al. | |
| 5,915,004 A * | 6/1999 | Pabbati et al. ........... | 379/100.08 |
| 6,208,717 B1 * | 3/2001 | Yeh et al. .................... | 379/88.18 |
| 6,298,375 B1 | 10/2001 | Millard | |
| 6,738,458 B1 * | 5/2004 | Cline et al. ................. | 379/88.18 |
| 6,751,301 B1 * | 6/2004 | Prasad et al. ................ | 379/88.18 |
| 6,983,308 B1 * | 1/2006 | Oberhaus et al. ............ | 709/206 |
| 7,065,541 B2 * | 6/2006 | Gupta et al. .......................... | 1/1 |
| 7,085,554 B2 | 8/2006 | Picard et al. | |
| 7,185,026 B2 * | 2/2007 | Browning et al. ............ | 707/634 |
| 7,218,926 B2 * | 5/2007 | Bocking et al. ............... | 455/419 |
| 8,140,631 B2 * | 3/2012 | Czeczulin ..................... | 709/206 |
| 2002/0059256 A1 * | 5/2002 | Halim et al. ..................... | 707/10 |
| 2003/0028555 A1 * | 2/2003 | Young et al. .................. | 707/204 |
| 2003/0167311 A1 * | 9/2003 | Kirsch .......................... | 709/206 |
| 2004/0139148 A1 * | 7/2004 | Norton et al. ................. | 709/200 |
| 2004/0267890 A1 | 12/2004 | Soulet | |
| 2005/0165861 A1 * | 7/2005 | Christie et al. ................ | 707/201 |
| 2005/0267938 A1 * | 12/2005 | Czeczulin ..................... | 709/206 |

(Continued)

OTHER PUBLICATIONS

"Exchange 2007 Cross Org Mailbox Migration" retrieved at <<http://msexchangeteam.com/archive/2006/11/02/430289.aspx , pp. 11.

(Continued)

*Primary Examiner* — Ario Etienne
*Assistant Examiner* — Sargon Nano
(74) *Attorney, Agent, or Firm* — Rau Patents LLC

(57) ABSTRACT

A mail enabled object may be migrated from one hosting server to another by using a temporary buffer that may capture incoming mail during the migration operation. A new mail enabled object may be created and enabled on a target server, and the old mail object may be disabled and forwarded to a buffer that may collect incoming messages. While the buffer receives incoming messages, the contents of the old mail object may be copied to the new mail object. After verifying the transfer of the contents, the buffer may be released to forward any collected messages to the new mail object. The old mail object may then be cleaned up. The migration may be performed from one server to another, from one forest to another, and to and from a remotely hosted messaging service.

13 Claims, 2 Drawing Sheets

U.S. PATENT DOCUMENTS

| | | | |
|---|---|---|---|
| 2006/0015641 A1 | 1/2006 | Ocko et al. | |
| 2006/0215632 A1 | 9/2006 | Adams et al. | |
| 2008/0052365 A1* | 2/2008 | Mousseau et al. | 709/206 |
| 2008/0109820 A1* | 5/2008 | Raghunandan | 719/313 |
| 2008/0256204 A1* | 10/2008 | Kamat et al. | 709/206 |
| 2009/0070702 A9* | 3/2009 | Malik | 715/780 |
| 2009/0075683 A1* | 3/2009 | Backholm et al. | 455/466 |
| 2009/0144743 A1* | 6/2009 | Wolslegel | 718/105 |
| 2010/0011033 A1* | 1/2010 | Czeczulin | 707/204 |
| 2010/0023492 A1* | 1/2010 | Lucas | 707/3 |

OTHER PUBLICATIONS

"Keeping Things Moving—Wizards and tools for relocating mailboxes and servers", 2007, Microsoft Corporation, pp. 3.

Grote, "Using the Exchange Migration Wizard", 2007, TechGenix Ltd., pp. 9.

"XGEN: Exchange Tools for Migration", 2007, Microsoft Corporation, pp. 4.

\* cited by examiner

MAIL OBJECT MIGRATION

BACKGROUND

Mail enabled objects, such as mailboxes, may be provided on different servers or using different services. For example, an enterprise may have one or more locally managed mail servers that may be organized in one or more forests of mail servers. Each mail server may host several mail enabled objects, and various routing servers may be installed so that incoming mail and internal mail is routed to the appropriate server that may host an intended recipient mail enabled object.

Over time, mail enabled object may be moved from one server to another or from one forest to another. For example, an employee may transfer from one department or location to another, and the employee's mailbox and other mail related objects may be transferred from one mail server to another.

In some cases, mail enabled objects may be migrated from a locally hosted server to remotely hosted service. The remotely hosted service may be accessible over the Internet or other wide area network.

SUMMARY

A mail enabled object may be migrated from one hosting server to another by using a temporary buffer that may capture incoming mail during the migration operation. A new mail enabled object may be created and enabled on a target server, and the old mail object may be disabled and forwarded to a buffer that may collect incoming messages. While the buffer receives incoming messages, the contents of the old mail object may be copied to the new mail object. After verifying the transfer of the contents, the buffer may be released to forward any collected messages to the new mail object. The old mail object may then be cleaned up. The migration may be performed from one server to another, from one forest to another, and to and from a remotely hosted messaging service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
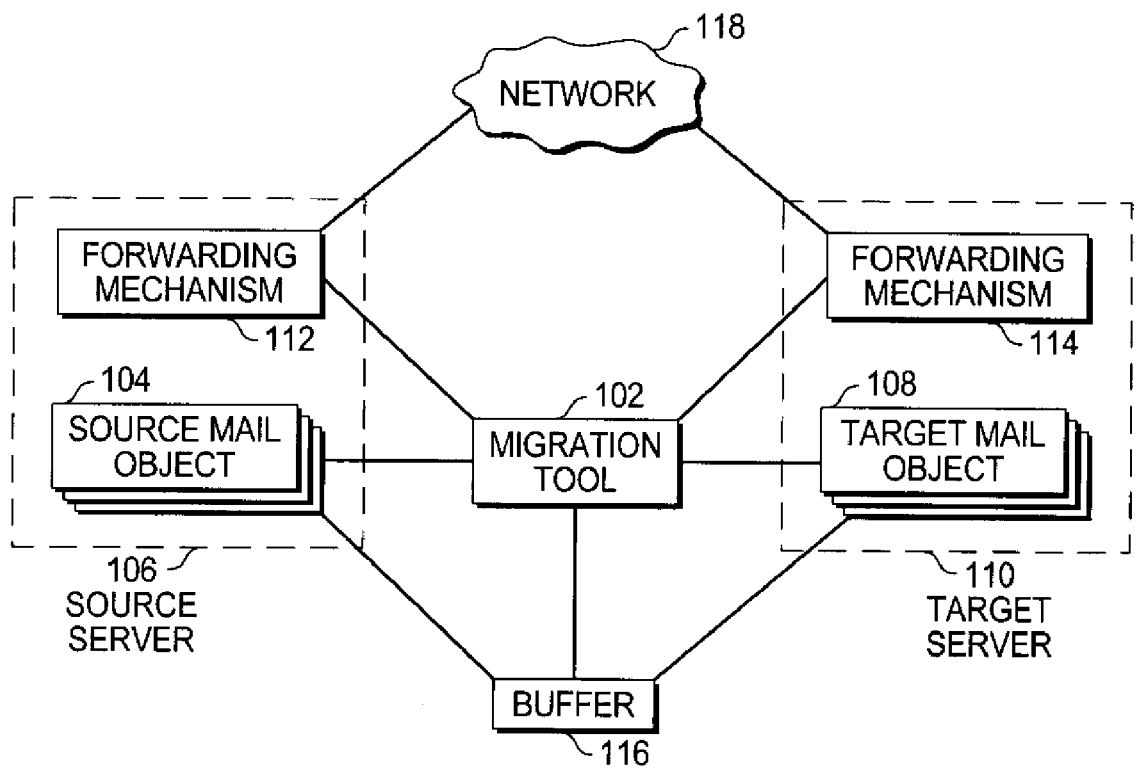
FIG. 1 is a diagram illustration of an embodiment showing a system with a mail object migration tool.

A buffer may be used during the migration of a mail enabled object to capture any incoming messages. Forwarding mechanisms may be configured to temporarily forward messages to the buffer so that no messages are lost while the contents of an old mail enabled object are transferred to a new mail enabled object. Once the contents have been transferred and verified, the forwarding mechanisms may be reset so that incoming messages are directed to the new mail enabled object.

The mail object migration may be performed from one mail server to another, from one mail forest to another, and between a locally hosted and remotely hosted mail service.

The migration may be performed without losing messages, as incoming messages may be forwarded to the buffer during the migration. The buffer may be a mail enabled service that may use a temporary namespace. The temporary namespace may be a subdomain used by a forwarding agent or other mechanism on the old mail enabled object during the migration.

Different embodiments may use differing sequences for performing a migration operation. In some embodiments, a single mail enabled object may be moved, while in other embodiments multiple mail enabled objects may be moved in a single operation. In this specification, example sequences are discussed for performing a migration, but the embodiments described are selected to highlight various operational features of the embodiment, not to limit the embodiment to a specific sequence.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system with a mail object migration tool. Embodiment 100 is a simplified example of a migration mechanism capable of moving a mail enabled object from one server to another without losing any incoming mail.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is an example of a system capable of migrating a mail enabled object from one server to another. The system may be capable of moving or migrating the mail enabled object without losing any incoming mail messages that may be received while the migration is being performed. The term migration may refer to the overall process of moving a user's mail enabled object to a new server while keeping the mail enabled object intact and the user's experience as close as possible to the prior configuration. In some embodiments, a migration may be performed without the user being able to detect a difference.

A mail enabled object may be any type of object that may receive messages. In many embodiments, a mail enabled object may have a mailbox for storing email messages as well as a list of contacts, scheduling items, tasks, or other items. In some embodiments, a mail enabled object may be a simple mailbox for receiving and storing email messages. For the purposes of this specification and claims, the terms "mail enabled object", "mail object", and similar terms are used interchangeably.

Migration of mail enabled objects may be performed for many reasons. For example, a small but growing company may find that one mail server does not provide adequate service and may add another mail server and migrate half of the mail enabled objects to the new server. A large enterprise may have separate mail servers for each division of the enterprise, and an employee's transfer between two divisions may prompt a migration. An organization may upgrade an aging mail server with new hardware and software and may wish to migrate all mail objects from the old hardware to the new hardware en mass.

In some cases, an organization may wish to change from an internally hosted mail system to a remotely hosted mail system. In a remotely hosted mail system, mail enabled objects may be hosted at a remote location and may be managed by a third party. In many such situations, the third party may be able to provide around the clock support, backup operations, and redundant systems that would otherwise be costly to provide locally. A user may access a remotely hosted mail enabled object by communicating over the Internet with a remote server.

Embodiment 100 comprises a migration tool 102 that may move a source mail enabled object 104 on a source server 106 to a target mail object 108 on a target server 110. In many embodiments a source server 106 and a target server 110 may be arranged in separate forests.

At the beginning of the migration, the source mail object 104 may be operational and accessible by a user. The user may access the mail object 104 using various applications that may enable the user to browse email, change contacts, add a schedule item, or perform other related functions. The mail object 104 may store email and other items in a persistent storage mechanism.

The migration tool 102 may interface with the source server 106 and target server 110 to cause the servers to perform various functions. In some embodiments, the migration tool 102 may send commands to an application programming interface (API) defined for each server. Other embodiments may use different mechanisms to interface with each server.

In some embodiments, a migration tool 102 may be incorporated as a capability of one or both of the servers, while in other embodiments, the migration tool 102 may be a standalone capability. Some implementations may use various hardware or software components, or combinations of hardware and software components to implement the functionality of the migration tool 102.

The migration tool 102 may implement various steps to migrate the source mail object 104 to the target mail object 108. Each embodiment may perform the steps in various configurations to achieve the migration. The details of the steps described in this specification are selected to highlight the functional aspects of a migration tool 102 but other sequences and steps may be used to achieve similar overall functionality.

The migration tool 102 may interface with various forwarding mechanisms 112 and 114 on the source server 106 and target server 110, respectively. The forwarding mechanisms 112 and 114 may be configured to forward messages received by the respective forwarding mechanism to another object, server, or other location.

In many embodiments, email that is received over a network 118 may be addressed to a general domain associated with a user. For example, a user's email address may be defined as user@example.com. Within a domain name server (DNS) system, a mail exchange record (MS record) may be defined to forward user@example.com to the source server 106, and the source mail object 104 may have an address of user@source.example.com, where the source.example.com subdomain may be associated with the source server 106. Similarly, the target mail object 108 may be created with an address of user@target.example.com.

The forwarding mechanisms 112 and 114 may be configured to receive a message within a subdomain and route the message to another subdomain. Other embodiments may use different mechanisms to forward and route messages. For example, some forwarding mechanisms may update the MX record for a user's mail address. In some cases, changes to an MX record may take a considerable amount of time to propagate and become effective. In other cases, a receive and forward mechanism may be able to be updated and changes become effective immediately.

The migration tool 102 may use a buffer 116 as a temporary storage device for storing and queuing messages that are received during the migration process. In some embodiments, the buffer 116 may be a server that has a storage mechanism and may have a different subdomain name from the source server 106 and target server 110. For example, the buffer 116 may be a server that has a subdomain buffer.example.com. Thus, a forwarding mechanism 112 or 114 may forward messages by forwarding an incoming message to an address of user@buffer.example.com, following the example above.

One example of a migration sequence may operate by first creating the target mail object 108 on the target server 110. The forwarding mechanism 114 may be configured to forward any mail received by the target mail object 108 to the source mail object 104. Some embodiments may not configure the forwarding mechanism 114 in such a manner at this stage, and may configure the target mail object 108 to receive messages received by the target mail object 108.

The target mail object 108 may be made active and accessible by a user at this point. The target mail object 108, when initially created, may be empty, while the source mail object 104 may contain a user's mailbox and other content.

The buffer 116 may be configured to receive and store incoming messages. The buffer 116 may have a forwarding mechanism that may forward messages to the target mail object 108, but such a forwarding mechanism may be paused during the mail object migration.

The source mail object 104 may be made inactive and any user activity with the source mail object 104 may be halted. The user may be directed to log off and log in, or the user connection may be redirected to the target server 110. In many embodiments, the user may be capable of adding, deleting, or modifying items within a mail enabled object to which the user is connected. By moving the user connection from the source mail object 104 to the target mail object 108, any user modification may be made on the target mail object 108 and user changes to the source mail object 104 may be stopped.

The forwarding mechanism 112 on the source server 106 may be configured to route incoming messages to the buffer 116. At this point in the sequence, the user may modify the target mail object 108 but not the source mail object 104. Also, any incoming messages may be routed to the buffer 116. In some embodiments, user access to either the source mail object 104 or the target mail object 108 may be suspended until a migration has been completed.

In many embodiments, a migration operation may be performed at night or during a downtime period where a user may not normally access a mail object. By doing a migration during such a period, the possibility is reduced that a user may make a change to a mail object that is not propagated to the final configuration.

In embodiments where the forwarding mechanism 114 is not configured to forward incoming messages, incoming messages received by the target mail object 108 may be received and stored in the target mail object 108.

In embodiments where the forwarding mechanism 114 on the target server 110 is configured to forward incoming messages to the source mail object 104, the messages may be routed to the forwarding mechanism 112 and then to the buffer 116. In many embodiments, the forwarding mechanism 114 may be configured in this manner so that an undo mechanism may be implemented if a migration is unsuccessful.

While the incoming messages to the source mail object 104 are forwarded to the buffer 116, the migration tool 102 may transfer the contents of the source mail object 104 to the target mail object 108. In cases where the contents are substantial and the connection between the two servers is slow, the contents transfer may take a considerable amount of time. During this period, incoming messages may be stored in the buffer 116 and, while such messages may not be accessible, the messages may not be lost.

The contents transfer between the source mail object 104 and the target mail object 108 may be performed with various translation, verification, or other functions. In some embodiments, the source server 106 and target server 110 may be operating different versions of a mail service or may perform mail functions in different manners. In such cases, data from the source mail object 104 may be translated, configured, or otherwise processed to conform to the configuration of the target mail object 108. Such processing may be performed during the transfer process in some embodiments. In other embodiments, such processing or translation may be performed before or after the contents transfer from the source server 106 to the target server 110.

In many embodiments, the contents transfer may be accompanied by verification that the contents were transferred correctly. In some embodiments, a verification mechanism may check the transfer of the contents during the transfer process, while in other embodiments, the verification may take place after transfer is complete.

The verification mechanism may be performed in many different manners. In a simple case, the contents transfer may occur using many small data messages. The data messages may be verified using a checksum, cyclic redundancy check (CRC), or some other message level verification. In other cases, verification may be performed after the transfer has occurred. One mechanism may be a by a bit by bit comparison of data in the source mail object 104 and the target mail object 108. In some cases, a hash may be calculated for data in the source mail object 104 and compared to a hash calculated for data in the target mail object. Other embodiments may use different verification mechanisms.

Once the contents have been transferred and verified, the target mail object 108 may be ready to receive and store messages. The buffer 116 may be configured to transfer incoming messages to the target mail object 108, and the forwarding mechanism 112 may be configured to forward messages to the target mail object 108. In addition, some embodiments may update an MX record to reflect the target server subdomain address for routing future incoming messages.

At this point in the migration process, the user may be allowed access to the target mail object 108, if such access was not granted previously. The target mail object 108 may contain all of the contents of the source mail object 104 plus any changes made by the user or through incoming messages.

Once the migration has been successfully completed, the source mail object 104 may be removed and any forwarding mechanisms may be directed to forward to the target mail object 108. In some cases, the buffer 116 may be kept operational for a period of time so that any incoming messages may be routed by the buffer 116 while the various forwarding mechanisms are being changed.

In some cases, the migration tool 102 may detect that the contents transfer has not been completed successfully. In such a case, the user access may be enabled for the source mail object 104, the forwarding mechanism 112 may be changed to forward messages to the source mail object 104. The buffer 116 may be configured to forward queued messages to the source mail object 104. In such a case, the migration may be aborted without losing any incoming messages.

The buffer 116 may be assigned a subdomain namespace, such as buffer.example.com. When messages are forwarded to the buffer 116, the messages may be forwarded to the subdomain namespace and held in a queue. In some embodiments, the buffer 116 may be capable of queuing incoming mail for multiple mail objects.

The buffer 116 may be capable of buffering and routing mail objects for individual mail objects. In such an embodiment, a temporary mail object may be created within the buffer 116 to queue messages. The temporary mail object may collect messages for the mail object and may forward those messages to a specific mail object when instructed. For example, a temporary mail object user@buffer.example.com may be created to queue incoming messages during a migration operation. The mail object user@buffer.example.com may have a forwarding mechanism that is capable of forwarding mail to the source mail object or target mail object. When no forwarding object is defined, messages that are collected in the temporary mail object may queue.

In another embodiment, the buffer 116 may collect mail without regard to a specific user name or mail object. When instructed, the buffer 116 may route the collected messages to another subdomain namespace en mass. For example, the buffer 116 may be assigned the subdomain namespace buffer.example.com. The buffer 116 may collect and queue any messages forwarded to the subdomain buffer.example.com regardless of the username associated with the message. When instructed, the buffer 116 may release the queued messages and forward the messages to a target subdomain by routing all the messages to target.example.com regardless of the username. In such an embodiment, the buffer 116 may normally operate as a forwarding mechanism to pass messages to the target subdomain, but may be paused during migration operations and resumed when the migration has completed. While paused, the buffer 116 may collect incoming messages and store the messages until forwarding is resumed.

In many messaging systems, the timing and sequence of forwarding mechanisms may occur with considerable delay. For example, a forwarding mechanism may be put in place to forward a message, and meanwhile several messages may be propagating through the network for a period of time. Those messages may appear at the original destination several minutes or longer after the forwarding mechanism may be put in place. In some cases, there may be a delay of hours or even days for some forwarding mechanism to take full effect.

With this in mind, some steps in a migration process may be performed over several minutes or hours so that messages in transit are able to reach a destination before another setting is implemented. Many embodiments may configure forwarding mechanisms to forward messages to the buffer 116 to capture messages that may be in transit during various stages of the migration process.

Figure 2:
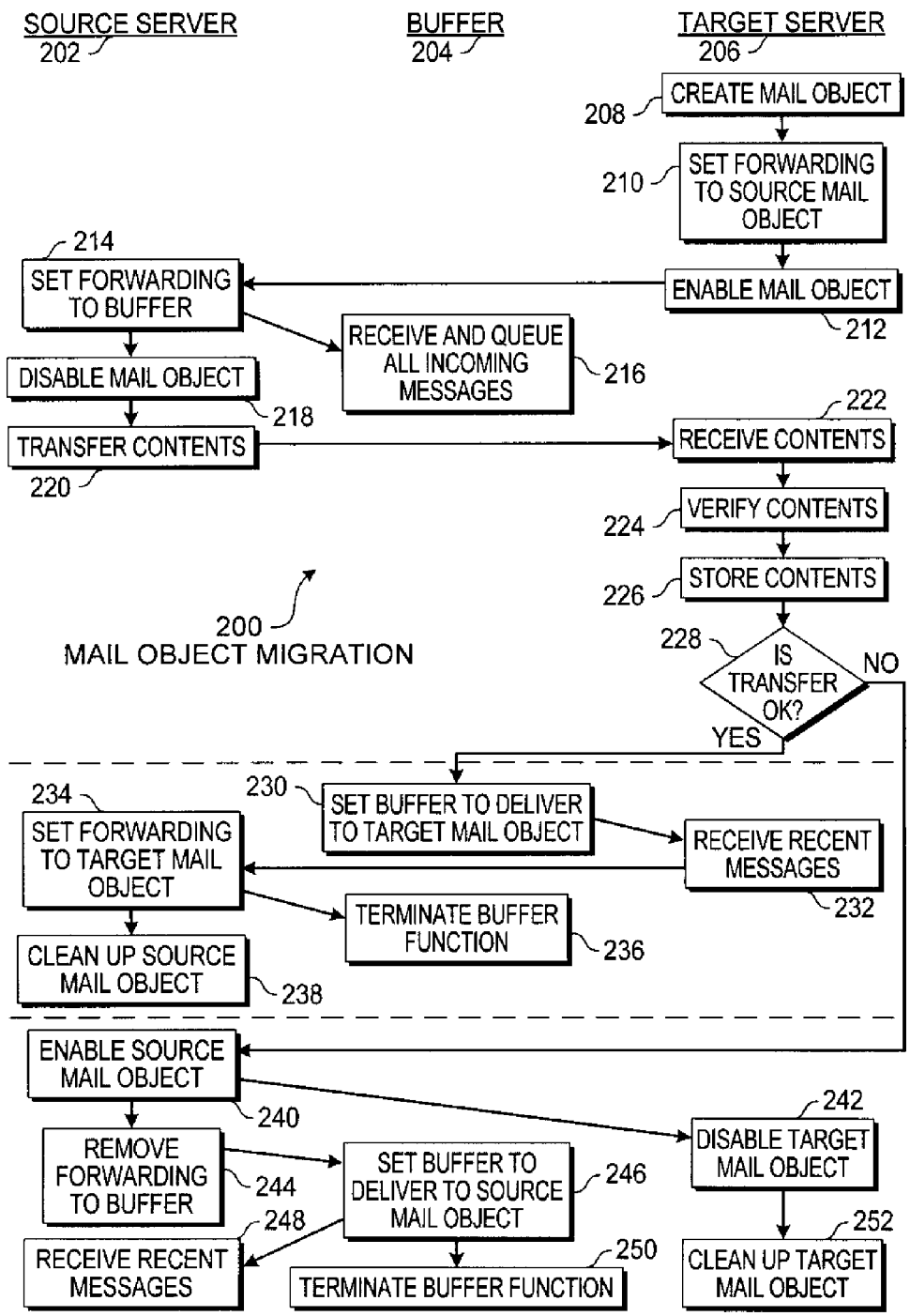
FIG. 2 is a timeline illustration of an embodiment showing a method for migrating a mail object.

FIG. 2 is a timeline diagram of an embodiment 200 showing the operations performed on a source server 202, a buffer 204, and a target server 206 over time during a migration operation. Embodiment 200 is an example of a sequence of operations that may be used to migrate a mail enabled object from a source server 202 to a target server 204.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a migration process that may be performed by a migration tool 102 as illustrated and discussed in FIG. 1.

In FIG. 2, the operations performed on or by a source server 202 are illustrated on the left hand column. Operations performed on or by a buffer 204 are illustrated in the center column, and operations performed on or by a target server 206 are illustrated in the right hand column. The operations depicted in embodiment 200 may be initiated by commands from a migration tool 102, which may be a standalone function or may be a function incorporated into the source server 202, the buffer 204, and/or the target server 206.

On the target server 206, a target mail object may be created in block 208. The target mail object may be the new mail object to which a source mail object may be migrated.

A forwarding mechanism may be set to forward messages received by the target server 206 to the source mail object in block 210.

The target mail object may be enabled in block 212. In other embodiments, the target mail object may not be enabled until after verification has been received. In embodiments where the target mail object is enabled in block 212, a user may have access to at least one mail object throughout the migration process. Such embodiments may make an undo or recovery process more difficult, as a user may change the contents of the target mail object which may be captured and updated to the source mail object during an undo process. In embodiments where the user is denied access to a mail object during the migration, an undo operation may be easier to perform.

On the source server 202, a forwarding mechanism may be configured to forward messages to the buffer 204 in block 214. The buffer 204 may receive and queue all incoming messages in block 216.

At this point in the process, incoming messages may be forwarded and stored in the buffer 204. Messages that may be received by the target server 206 may be forwarded to the mail object on the source server 202, and messages received on the source server 202 including those forwarded by the target server 206 may be forwarded to the buffer 204.

In this situation, the only mechanism for changing any mail object may be a user. If the user is denied access to both the source and target mail objects, there are no mechanisms by which changes may be made to the mail objects.

The contents of the source mail object may be transferred in block 220 by the source server 202 and received by the target server 206 in block 222. In some embodiments, a bit by bit copy of the contents may be performed. In other embodiments, various translations, manipulations, or other processing may be performed during the transfer. For example, a translation or manipulation may be performed to enable the contents of the source mail object to conform to a target mail object in some cases.

In many embodiments, the contents of the source mail object may include items such as mail messages, but may also include particular items that may be used by a client application to access the mail object. Such items may include unique identification labels such as globally unique identification (GUID) labels for the mail enabled object or data containers in the mail enabled object. Such identifiers may enable client applications to connect to the newly created target mail object and operate on the target mail object as if the target mail object were the source mail object.

The transferred contents may be verified in block 224. The verification may be performed in any manner. In some embodiments, the verification may be performed during the transfer process, while in other embodiments, the verification may be performed after the transfer is complete.

Once verified, the contents may be stored in block 226 and may be ready to use. The storage of block 226 may be to store the contents in a target mail object.

If the transfer occurs without errors in block 228, the buffer 204 may be set to deliver queued messages to the target mail object in block 230, which may be received by the target mail object in block 232. At this point in the process, the target mail object may be enabled if it already has not been. The target mail object may contain verified contents of the source mail object plus any messages received during the transfer process. The remaining items may relate to cleaning up.

In block 234, the forwarding mechanism of the source server 202 may be set to forward to the target mail object. Previously, the same forwarding mechanism was configured in block 214 to forward to the buffer 204. Here, the buffer 204 may be taken out of the loop. After a period of time, the buffer function may be terminated in block 236. The period of time may be several milliseconds to several hours, depending on the particular characteristics of the forwarding mechanisms and other elements. The period of time may be used to allow messages that were forwarded to the buffer 204 to propagate through the network, arrive at the buffer 204, and be forwarded to the target mail object.

The source mail object may be cleaned up in block 238. In some embodiments, the source mail object may be deleted and references to the source mail object may be updated to reflect the target mail object.

If the transfer was not proper in block 228, a process for undoing the transfer or reverting to the original source mail object may be performed. The process may begin by enabling the source mail object in block 240 and disabling the target mail object in block 242. In some embodiments, the target mail object may not have been previously enabled in block 212.

The forwarding mechanism of block 214 may be removed in block 244 so that incoming messages are not routed to the buffer 204. The buffer 204 may be configured to deliver stored messages to the source mail object in block 246. The messages may be received on the source server 202 in block 248. After a period of time, the buffer function may be terminated in block 250.

By disabling the forwarding mechanism in block 244 and then enabling the forwarding in block 246, a circular loop may be avoided between the buffer 202 and the source mail object on the source server 202.

At this point in the process, the source mail object is operational and may contain any messages received during the attempted but aborted migration process. If the target mail object was enabled in block 212, changes made by the user to the target mail object may be updated to the source mail object. In cases where the migration fails for some reason, such changes may not be available for updating and may be lost.

The target mail object may be cleaned up in block 252. Each embodiment may have different operations for cleaning up, and some may include removing the target mail object, merging any changes made to the contents of the target mail object with the source mail object, and removing any other changes made during the migration.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
creating a new mail enabled object;
configuring a first forwarding mechanism on an old mail enabled object, said first forwarding mechanism configured to forward messages to a buffer;
configuring a second forwarding mechanism on said new mail enabled object, said second forwarding mechanism configured to forward messages to said old mail enabled object from said new mail object, wherein an undo mechanism is provided by said second forwarding mechanism, on said new mail enabled object, configured to forward messages to said old mail enabled object from said new mail object;
redirecting user access from said old mail enabled object to said new mail enabled object;
transferring at least some contents of said old mail enabled object to said new mail enabled object;
changing said first forwarding mechanism to forward messages to said new mail enabled object; and
forwarding contents of said buffer to said new mail enabled object.

2. The method of claim 1 further comprising:
verifying said contents of said new mail enabled object.

3. The method of claim 2, said verifying being performed during said transferring.

4. The method of claim 2, said verifying being performed after said transferring.

5. The method of claim 1, said creating said new mail enabled object comprising enabling user access to said new mail enabled object.

6. The method of claim 5, said configuring said first forwarding mechanism comprising disabling said old mail enabled object.

7. The method of claim 1, said new mail enabled object being a remotely hosted mail enabled object.

8. The method of claim 1, said contents comprising an identification for said old mail enabled object.

9. A computer readable storage medium not comprising a propagated wave but comprising computer executable instructions configured to perform the method of:
creating a new mail enabled object on a new mail server;
configuring a first forwarding mechanism on said new mail enabled object, said first forwarding mechanism configured to forward messages to an old mail enabled object from said new mail object, wherein an undo mechanism is provided by said first forwarding mechanism, on said new mail enabled object, configured to forward messages to said old mail enabled object from said new mail object;

configuring a second forwarding mechanism on said old mail enabled object, said second forwarding mechanism configured to forward messages to a buffer;

transferring at least some contents of said old mail enabled object to said new mail enabled object and removing said first forwarding mechanism;

changing said second forwarding mechanism to forward message to said new mail enabled object; and forwarding contents of said buffer to said new mail enabled object.

10. The computer readable medium of claim 9, said method further comprising:

enabling said new mail enabled object for user access when said new mail enabled object is created.

11. The computer readable medium of claim 9, said contents comprising an identifier for said old mail enabled object.

12. The computer readable medium of claim 9, said method further comprising:

verifying said contents.

13. The computer readable medium of claim 9, said new mail enabled object being a remotely hosted object.

* * * * *